United States Patent Office 3,129,961
Patented Apr. 21, 1964

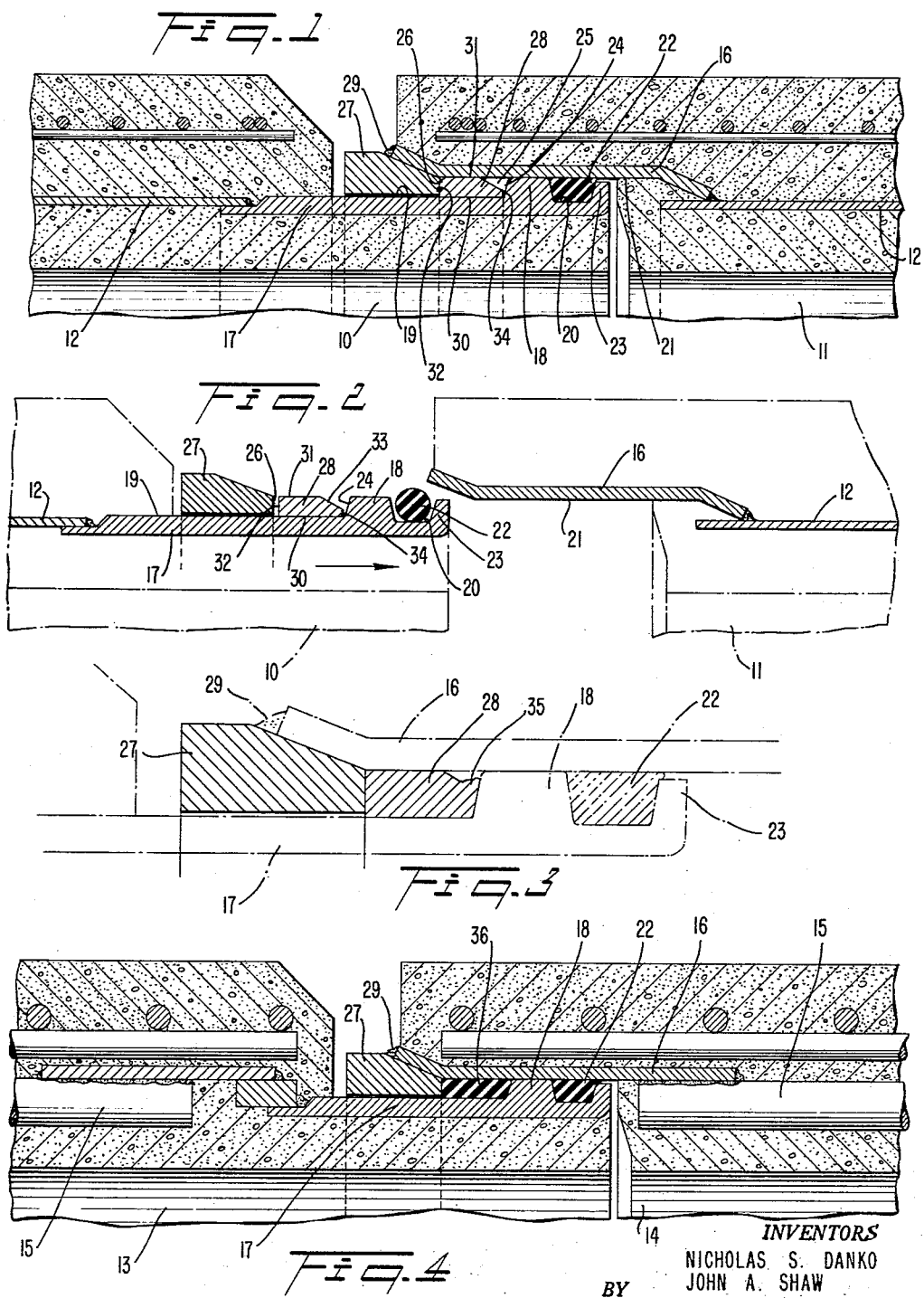

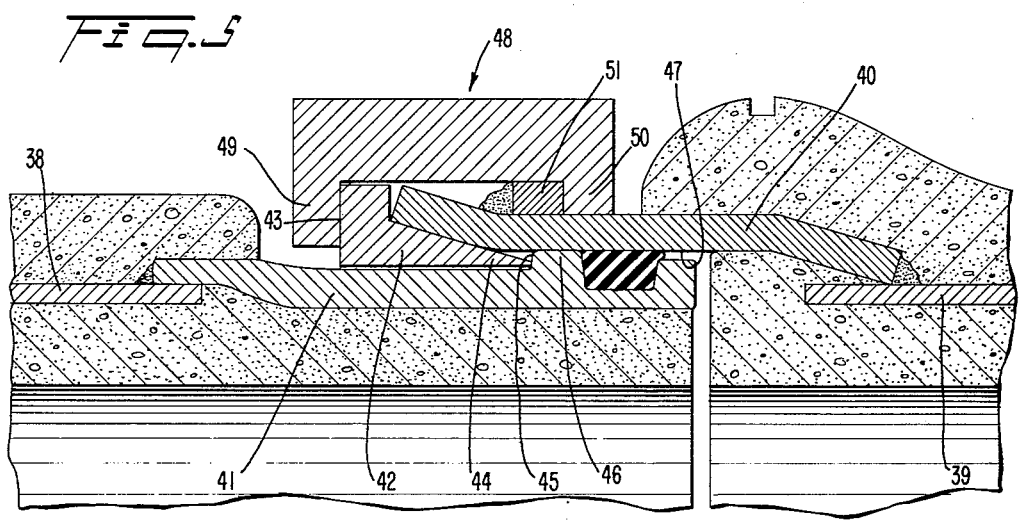
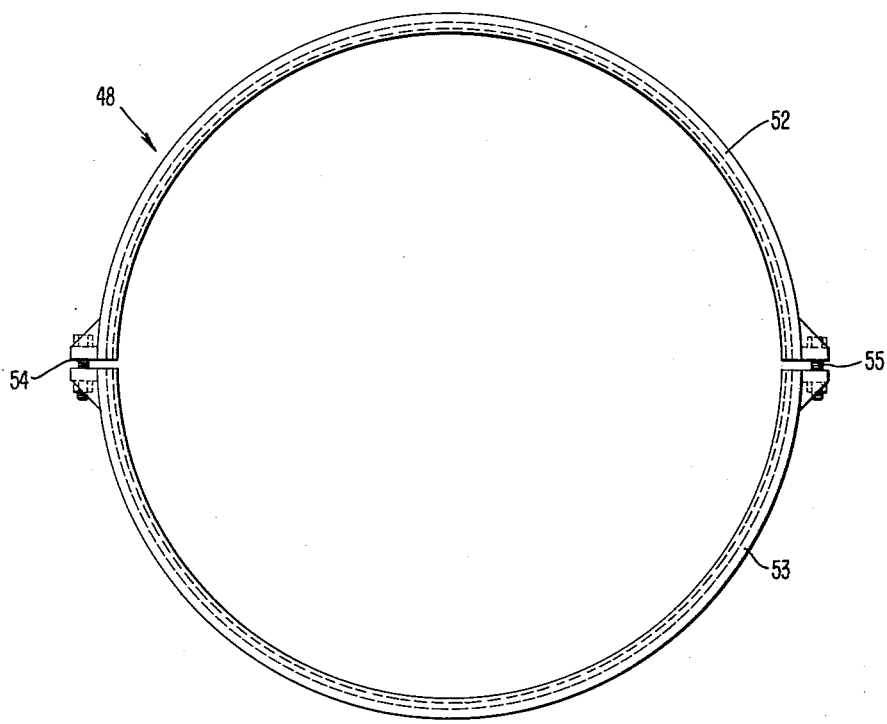

3,129,961
MEANS FOR HARNESSING PIPE JOINTS
Nicholas S. Danko, Livingston, John A. Shaw, West Orange, and John T. McCall, Mountain Lakes, N.J., assignors to International Pipe and Ceramics Corporation, East Orange, N.J., a corporation of Delaware
Filed Jan. 10, 1961, Ser. No. 81,730
7 Claims. (Cl. 285—230)

This invention relates to pipe joints and, more particularly, to means for harnessing joints.

The form of joint with which the present invention is concerned has joint members which are telescoped, one within the other, in a manner to make a flexible joint between adjacent pipe sections. One of the joint members has an annular groove and a centering surface of limited width by which the joint member is centered with respect to a relatively wider cylindrical sealing surface of the other joint member. A sealing gasket of the O-ring type, usually made of rubber or of other suitable resilient material, is contained in the groove and provides a fluid-tight seal between the joint members.

This type of joint has been used extensively in pipe lines of water supply systems. The joint is closed and sealed simply by moving one joint member into the other after the gasket has been mounted in the gasket-retaining groove. The gasket is forcibly deformed and pressed in to its retaining groove by a piloting surface at the forward end of the cylindrical sealing surface as the joint members are being engaged. The joint is flexible in that it allows for deflection of the axes of adjoining pipe sections as well as longitudinal movement between joined members without affecting the seal.

The fluid contained within a pipe line effects a thrust against any plane which is not parallel to the pipe axis, such as is provided by elbows, valves and terminal bulkheads. The thrust tends to expand joints or separate the ends of joined pipe sections. The magnitude of thrust can be appreciated by considering that for a pipe line having an internal diameter of 6 feet, a joint diameter of approximately 76.4 inches, and an internal hydrostatic pressure of 100 pounds p.s.i., a thrust of the order of approximately 456,000 pounds could develop.

For some pipe line installations in which the size of pipe and the internal pressure permits, the weight of the back fill and the friction of the soil suffice to prevent the opening of joints, and when additional resistance is required, abutments are fastened to the pipe sections to anchor them in the surrounding soil. Devices employing bolts or other linking members extending between brackets which are attached to the respective complementary joint members or pipe sections have also been used to prevent excessive movement, but they are costly and, for the most part, they have the disadvantage of undesirably affecting the flexibility of the joints. Bolts or other tying members that are spaced around the exterior of connected pipe ends are subject to becoming unequally stressed to an inordinate degree when joined pipe sections deflect. The tying members cause concentrations of stresses in the pipe structures at points where the forces on the tying members, or the moments of the forces, are transmitted thereto. These stresses sometimes damage the pipe structures and can be of considerable magnitude especially when the internal pressure is high, or when an installation is made up of large diameter pipe.

It is accordingly among the objects of the invention to provide pipe joint constructions which obviate the noted objections to previously used constructions.

Another object of the invention is to provide improved means for harnessing a joint by which the full force of a longitudinally acting thrust is uniformly distributed around the joint to each of joined pipe members.

Another object is to provide yieldable thrust-transmitting means between joint members whereby to restrict the axial movement of one joint member relatively to another to a permissible modicum and to compensate for deflection of their axes without material change in the continuity of the thrust-transmitting or transferring pattern around the joint.

With these and other objects which will appear in the following specification, the invention consists of certain novel features of construction and combination of parts, the essential elements of which are set forth in the appended claims.

In the accompanying drawing,

FIG. 1 is a longitudinal section of a portion of a harnessed joint employing the invention;

FIG. 2 illustrates the relationship of various elements of the joint of FIG. 1, before the joint is closed;

FIG. 3 is an enlarged schematic view illustrating the effect of thrust on the thrust-transmitting member illustrated in FIG. 1;

FIG. 4 is a longitudinal section of a portion of a harnessed joint embodying resilient thrust-transmitting material;

FIG. 5 is a longitudinal section of a modified form of the invention; and

FIG. 6 is an end view of the channel-shaped clamp shown in FIG. 5.

The harnessed joints of FIGS. 1 and 4 are shown as applied to reinforced concrete pipe sections which have steel members attached to and extending between complementary joint rings of steel. The steel connecting the joint rings of each pipe section relieves the concrete from tensional stress in the longitudinal direction of the section due to the application of force to either joint ring. The specific physical character and shape of the steel connecting the joint rings of any pipe section are inconsequential so long as the steel is adequate to withstand the maximum longitudinally acting stresses to which a given pipe may become subjected. Thus, in the pipe sections 10 and 11 of FIG. 1, hollow steel cylinders 12 are provided, and in the pipe sections 13 and 14 of FIG. 4, a plurality of steel rods or bars 15 are distributed at intervals around the pipe sections. As is well understood, the pipe sections may be otherwise reinforced as required to meet the strength requirements for the size and pressure of any particular pipe line.

It is to be understood that the embodiments of the invention shown in FIGS. 1 and 4 are also applicable to steel pipes and that even though steel pipe sections are illustrated in FIG. 5, the harnessing means shown in the latter figure are also applicable to use with other types of pipes. In the interest of brevity, similar elements are identified with like reference characters in FIGS. 1 to 4.

Referring to FIG. 1, the socket end of the pipe section 11 is lined with a steel bell ring 16 and the adjoining end of the other pipe section 10 is provided with a steel spigot ring 17. The joint rings of the respective sections are welded to their connecting cylinders 12.

The bell ring 16 may be conventional. The spigot ring 17 is provided with a novel exterior contour which is characterized by a rib or ridge-like structure 18 upstanding from lower exterior surfaces 19 and 20 at their side of the rib. The outer peripheral surface of the rib has a maximum diameter slightly less than the diameter of the inner circumference of the cylindrical inner surface 21 of the bell ring, whereby the adjoining ends of connected pipe sections are centered. An annular groove for containing a gasket 22 is located intermediate the rib 18 and a flange 23 at the free end of the spigot ring. The gasket is forcibly contained within the groove by the cylindrical surface 21 of the bell ring to seal the joint. The seal thus provided is of the well-known O-ring type wherein a continuous annular ring of rubber or other resilient material is pressed into an annular confining space.

The rib 18 provides a shoulder 24 facing away from the free end of the spigot and this shoulder serves as a side wall for an annular space 25 between the bell and spigot rings. The side wall of the annular space opposite from the shoulder 24 is provided by the edge 26 of a retaining ring 27 which surrounds the spigot ring.

The annular space between the rib 18 and the ring 27 houses a thrust-transmitting member 28 by which the thrust from one pipe section is transmitted to an adjoining pipe section. In a normally closed joint the side walls 24 and 26 are so spaced as to be close to or in engagement with the thrust-transmitting member therebetween before a pipe line is subjected to internal hydrostatic pressure. The character of the thrust-transmitting member is such as to yield under pressure exerted thereon by the oppositely acting forces imparted by the rib 18 and the ring 27 and permit change in the positions of the engaged pipe sections when they are subject to axial thrust, as will be explained more fully hereinafter.

The ring 27 is preferably made of steel and it is so formed as to engage the bell ring and to substantially close off the space in which the thrust-transmitting member 28 is housed. In the form illustrated, the bell ring 16 is provided with a flaring or piloting surface which serves to press the gasket 22 into its groove as the spigot is advanced into the bell. In order to fit closely to or engage with the bell, the retaining ring 27 is provided with a tapering surface which is sloped similarly to the flaring inside surface of the bell ring. For locating the wall-forming edge 26 within the circumference of the cylindrical surface 21 of the bell ring, the ring 27 may be widened and made to extend axially with a portion thereof providing a cylindrical surface opposite from the inner cylindrical surface 21 of the bell ring.

The inner diameter of the retaining ring 27 is only sufficiently over-large with respect to the diameter of the cylindrical surface 19 of the spigot ring to allow for deflection between joined pipe sections. For assembling the ring 27 to the spigot in the field, a split ring may be employed or the ring may be formed from segments. In either case the ends are preferably spliced to achieve a continuous ring. An initially continuous retaining ring may be used if the ring is positioned in place around the spigot ring before the spigot ring is attached to a steel cylinder.

The various parts are illustrated in FIG. 2 in their relative positions before the joint is closed. After the spigot has been shoved home to a joint-closing position, the retaining ring 27 is moved forwardly along the spigot until it comes in contact with the flaring surface of the bell, as shown in FIG. 1. In this position the ring 27 is welded fast to the bell ring at 29. The weld may be continuous entirely around the circumference of the ring, or the welded connection may be made to consist of a series of welds uniformly spaced around the circumference, depending upon the maximum stress which could develop under operating conditions.

When the width of the annular space provided between the rib 18 and the ring 27 is substantially equal to the width of a thrust-transmitting member within the space, any endwise movement of the joined pipe sections which tends to open the joint will effect oppositely acting forces on the thrust-transmitting member. If all of the initially available space 25 were filled with a solid, non-yieldable member, no expansion of the joint could occur. The joint would be rigid in contradistinction to the aims of the present invention.

The thrust-transmitting member utilized to carry out the invention is deformable under pressure. Owing to the cohesiveness of the material of the member, it functions to allow a limited axial movement of the pipe sections away from one another which is proportional to a prevailing thrust. Since the flow of the material is restricted, both longitudinally and circumferentially of the joint, it effects the transfer of thrust from one joint member to the other over a continuous area encircling the joint, irrespective of either an aligned or deflected relationship of the axes of joined pipe sections.

In the embodiment of the invention illustrated in FIG. 1, the cross-sectional area of the thrust-transmitting ring 28 is less than the area of the available space 25 between the shoulder 24 and the side wall 26 of the retaining ring 27. The difference between these areas provides an open area into which the material of ring 28 may flow as the distance between the shoulder 24 and the edge 26 shortens under pressure of a thrust.

The ring 28 may be formed of any suitable metal which will deform and flow under pressure and ranging in hardness or ductility from aluminum to malleable iron and soft steel. The cross-sectional form of the ring is variable, depending upon the material used and the magnitude of the thrust to be resisted. A cross-sectional form similar to that illustrated in FIG. 1 has proven satisfactory for an aluminum ring. It includes oppositely disposed inner and outer cylindrical surfaces 30 and 31, respectively adjacent the surface 19 on the spigot ring and the surface 21 on the bell ring, FIG. 2. The surfaces 30 and 31 are connected at one end by a radial surface 32 and at the other end by a conical surface 33 and a short radial surface 34 adjacent the shoulder of the rib 18. The cross-section is so formed that when the thrust-transmitting ring is subjected to appreciable forces acting oppositely through the retaining ring 27 and the rib 18, the thinner edge 34 of the ring will thicken somewhat as indicated at 35 in FIG. 3 by the radially outward movement of the material of the ring as the width of the ring diminishes.

Whenever the axes of the two joint rings 16 and 17 are coincident, the deformed cross-sectional area of the thrust-transmitting ring is substantially the same in any diametrical plane. Should the axes be deflected, the width of the deformed ring between the deflected joint rings will vary within an arc of 180° around the circumference of the joint from a maximum to a minimum, in proportion to the spacing of the side wall 24 from the side wall 26 of the confining space at different locations around the joint. Even though the joint be deflected, the thrust-transmitting ring will be subjected to compression entirely around its circumference.

In pipes intended to withstand lower hydrostatic pressures, and where the thrust exerted on the joints would be of a more moderate magnitude, a suitable elastomeric material may be used. This material may be in the form of a continuous ring of rubber. To limit the movement between joined pipe sections to a minimum, it is important that the volume of the rubber be approximately equal to the volume of the space available for confining the ring. It will be understood that when the joint is initially closed it may be necessary to alter the cross-section of the rubber in order to correctly place the retaining ring against the flaring portion of the bell ring so that the retaining ring may be welded thereto in fixed position. A rubber thrust-transmitting ring 36 is illustrated in FIG. 4. As pressure is brought to bear on the ring by the bead 18 and the retaining ring 27, the thrust-transmitting ring will allow limited movement between the joint rings as the rubber deforms and flows to fill any voids that are initially present. Owing to its resilient property, rubber will flow circumferentially from the portion of the annular space which is narrower towards the portion of the annular space which is wider when the joint members deflect.

A modified harnessing means is shown in FIG. 5 in conjunction with joined ends of steel pipes 38 and 39 which are lined and protected with mortar. The bell ring 40 bears the same relationship to the spigot ring 41 as has been described hereinabove.

The thrust-transmitting member 42 is made of metal formed into a ring having an abutment surface 43 disposed beyond the mouth of the bell ring. Its length is such as to provide a tapering portion 44 with a fin-like edge for engaging the shoulder 45 of the rib 46 when the joint is assembled, as shown in FIG. 5. The outside surface of the tapering portion 44 engages the flaring inner surface of the bell and extends to the base of the rib 46 whereby sufficient space is provided inside of the bell surface 47 to accommodate the metal displaced under pressure.

The thrust ring 42 is retained solidly in assembled position by a clamping ring 48 having a flange 49 which engages the abutment surface 43, and a flange 50 which engages a rib 51 around the outside of the bell ring 40. The rib 51 may be integrally formed with the bell ring, or may constitute a separate ring welded to the bell ring. The clamping ring includes two semi-circular halves 52 and 53 with adjacent ends connected together by bolts 54, 55. This construction is particularly useful when it is desired to avoid welding, or when the ring is made of a non-ferrous metal, such a structural or wrought aluminum.

The application and use of the invention will be apparent to those skilled in the art in view of the foregoing disclosure. While structures have been described which are presently considered to represent the best mode for carrying out the invention, it is to be understood that various features and elements in the combinations and relationships involved may be altered and others omitted without departing from the scope of the invention privileged by the appended claims.

What is claimed is:

1. In a joint for pipe sections having steel bell and spigot joint rings at adjacent ends of the pipe sections, the combination of an outer joint ring of steel having a substantially cylindrical interior surface and a distal end surface flaring outwardly from said cylindrical interior surface to the mouth of said outer joint ring; a spigot joint ring of steel extending from without the mouth of the outer joint ring to within said outer joint ring and thereby providing overlapping portions of the respective joint rings, said spigot joint ring having a longitudinal sectional profile providing a stepped outer surface disposed opposite to said cylindrical interior surface of said outer joint ring, said stepped outer surface formed in part by a flange adjacent the distal end of the spigot joint ring, a rib spaced axially from said flange and providing a circumferential recess disposed to the side of said rib facing said flange, and a substantially cylindrical exterior surface disposed to the other side of said rib and extending axially from the rib to beyond the mouth of said outer joint ring and continuing toward the base end of said spigot joint ring; said rib extending radially outwardly from said cylindrical exterior surface of said spigot joint ring to adjacent the cylindrical interior surface of said outer joint ring and thereby defining a wall at one end of an annular space around said cylindrical exterior surface of said spigot joint ring and between said joint rings; sealing means contained in said circumferential recess; a ring of deformable material encircling said cylindrical exterior surface of said spigot joint ring; means for retaining said ring of deformable material adjacent to said rib, said retaining means including a steel ring overlying the cylindrical exterior surface of said spigot joint ring with its inner periphery leaving a clearance between the steel ring and said exterior cylindrical surface of said spigot ring and thereby allowing for lateral deflection of one joint ring relatively to the other and means for fixedly attaching said steel ring in positive locking engagement to said outer joint ring, said ring of deformable material having a solid content of less volume than the volume of said annular space and being substantially free from stress in the absence of fluid pressure within the joined pipe sections, whereby the action of an axial thrust from one of said joint rings to the other due to reaction from fluid pressure within the joined pipe sections is transmitted through said ring of deformable material.

2. A joint according to claim 1 in which said ring of deformable material comprises ductile metal of less volume than the volumetric capacity of said annular space.

3. A joint according to claim 1 in which said ring of deformable material comprises a metal ring having peripheral surfaces forming a tapered end portion of the ring.

4. A joint according to claim 1 in which said ring of deformable material is comprised of aluminum.

5. A joint according to claim 1 in which said ring of deformable material is comprised of rubber.

6. In a pipe joint, the combination of pipe sections having telescopically engaged bell and spigot portions, the bell portion including a steel ball ring having an inner cylindrical sealing surface and a flaring surface sloping axially and radially outwardly from said cylindrical sealing surface to the mouth of said bell ring, the spigot portion including a steel spigot ring having a cylindrical outer surface, an encircling rib intermediate said cylindrical outer surface and the free end of the spigot ring, said rib providing a centering surface disposed close to said cylindrical sealing surface of said bell ring, sealing means in sealing engagement with said spigot ring and with said cylindrical sealing surface of said bell ring, said sealing means disposed to the side of said rib facing the free end of the spigot, said rib having a shoulder facing away from the free end of the spigot and defining a side wall of an annular space between said bell and spigot rings, a metallic thrust-transmitting ring mounted in said annular space and having an axial dimension exceeding the distance from said shoulder to the mouth of said bell portion, said thrust-transmitting ring having an inner peripheral surface facing said cylindrical outer surface of said spigot ring and a sloping surface contacting said flaring surface and extending beyond the intersection of said flaring surface and said inner cylindrical sealing surface to form a wedge-shaped end of the thrust-transmitting ring adjacent said shoulder, the inner peripheral surface of the thrust-transmitting ring having a diameter slightly greater than the diameter of said cylindrical outer surface of the spigot ring to provide a clearance space allowing for lateral deflection of one joint ring relatively to the other, and means for holding said thrust-transmitting ring immovable with respect to said bell ring.

7. The combination set forth in claim 6 wherein said holding means comprise a clamping ring engaging said bell ring and the end of said thrust-transmitting ring opposite from the wedge-shaped end of the thrust-transmitting ring.

References Cited in the file of this patent

UNITED STATES PATENTS

| | | |
|---|---|---|
| 1,694,822 | Kennedy | Dec. 11, 1928 |
| 1,830,440 | Morgan | Nov. 3, 1931 |
| 2,173,792 | Trammell | Sept. 19, 1939 |
| 2,295,510 | Ball | Sept. 8, 1942 |
| 2,416,618 | Ferla | Feb. 25, 1947 |
| 2,467,911 | Reilly | Apr. 19, 1949 |